US011102658B2

(12) United States Patent
Hannan et al.

(10) Patent No.: US 11,102,658 B2
(45) Date of Patent: Aug. 24, 2021

(54) METHODS AND SYSTEMS FOR RESOURCE PLANNING IN A SHARED SPECTRA

(71) Applicant: CommScope Technologies LLC, Hickory, NC (US)

(72) Inventors: Ariful Hannan, Sterling, VA (US); Mayowa Aregbesola, Herndon, VA (US); Suryanarayana A. Kalenahalli, Chantilly, VA (US); Olivani Subbukutty, Chantilly, VA (US); Raina Rahman, Herndon, VA (US); Navin Srinivasan, Fairfax, VA (US); Khalid W. Al-Mufti, Sterling, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/835,605

(22) Filed: Mar. 31, 2020

(65) Prior Publication Data
US 2020/0314659 A1   Oct. 1, 2020

Related U.S. Application Data

(60) Provisional application No. 62/827,460, filed on Apr. 1, 2019.

(51) Int. Cl.
*H04W 16/14* (2009.01)
*H04W 16/10* (2009.01)
(Continued)

(52) U.S. Cl.
CPC ............ *H04W 16/14* (2013.01); *G06F 16/29* (2019.01); *H04W 4/029* (2018.02); *H04W 16/10* (2013.01);
(Continued)

(58) Field of Classification Search
CPC ...... H04W 16/14; H04W 4/029; H04W 16/10; H04W 16/18; H04W 72/0453; H04W 72/082; G06F 16/29
See application file for complete search history.

(56) References Cited

U.S. PATENT DOCUMENTS

2007/0064784 A1   3/2007  Dehghan et al.
2008/0076404 A1*  3/2008  Jen ........................ H04W 76/19
                                                          455/423
(Continued)

OTHER PUBLICATIONS

Drocella et al., "3.5 GHz Exclusion Zone Analyses and Methodology", NTIA Report 15-517, Jun. 2015, pp. 1-103, U.S. Department of Commerce.
(Continued)

*Primary Examiner* — Dai Phuong
(74) *Attorney, Agent, or Firm* — Fogg & Powers LLC

(57) ABSTRACT

Techniques for modelling a radio network in a geographic region utilizing shared spectra are disclosed. Population data is obtained for the geographic region. A number of radios per channel in the geographic region, N', is determined. Candidate geographic location for radios in the geographic region are determined. For every channel in the shared spectra, at least one of a static dataset and a dynamic dataset is determined. At least one set of output data, that is a statistical characterization of the radio network, is generated using at least one of the static dataset and the dynamic dataset, to aid in design of the radio network.

32 Claims, 2 Drawing Sheets

Figure 1:
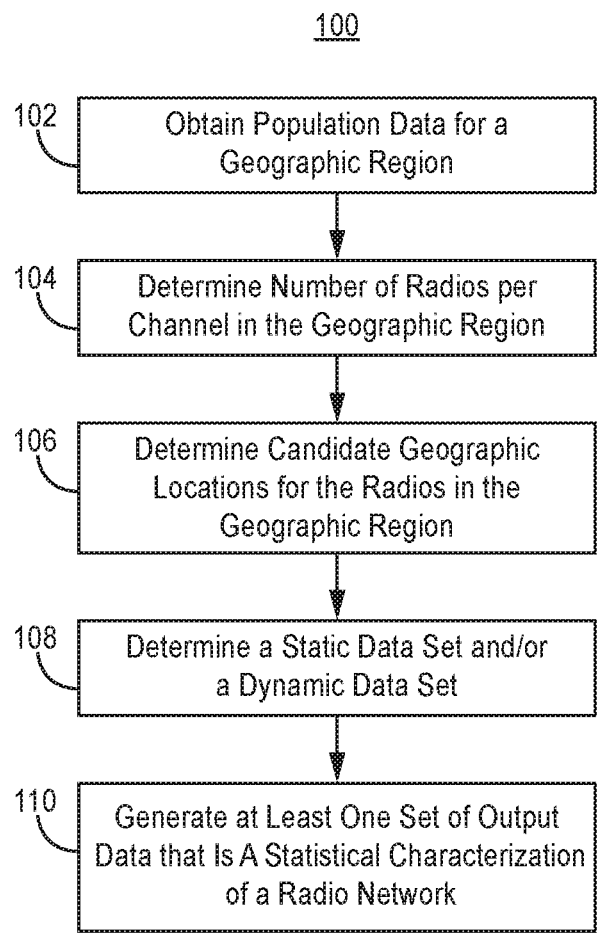

(51) Int. Cl.
*H04W 72/08* (2009.01)
*H04W 16/18* (2009.01)
*G06F 16/29* (2019.01)
*H04W 72/04* (2009.01)
*H04W 4/029* (2018.01)

(52) U.S. Cl.
CPC ....... *H04W 16/18* (2013.01); *H04W 72/0453* (2013.01); *H04W 72/082* (2013.01)

(56) References Cited

U.S. PATENT DOCUMENTS

| | | | | |
|---|---|---|---|---|
| 2010/0017861 | A1* | 1/2010 | Krishnaswamy | ....... H04L 29/06 726/7 |
| 2012/0184283 | A1* | 7/2012 | Mueck | ................ H04W 28/04 455/452.1 |
| 2015/0365941 | A1* | 12/2015 | Liu | ........................... H04L 5/14 370/280 |
| 2016/0100320 | A1 | 4/2016 | Dayanandan et al. | |
| 2017/0085494 | A1* | 3/2017 | Park | ........................ H04L 47/70 |
| 2017/0295497 | A1 | 10/2017 | MacMullan et al. | |
| 2018/0152848 | A1 | 5/2018 | Egner et al. | |
| 2018/0213407 | A1 | 7/2018 | Miao et al. | |
| 2018/0376341 | A1 | 12/2018 | Khoshnevisan et al. | |

OTHER PUBLICATIONS

Wireless Innovation Forum, "Requirements for Commercial Operation in the U.S. 3550-3700 MHz Citizens Broadband Radio Service Band", WINNF-TS-0112, Version V1.4.1, Jan. 16, 2018, pp. 1-77, The Software Defined Radio Forum Inc.

International Searching Authority, "International Search Report and Written Opinion from PCT Application No. PCT/US2020/025893", from Foreign Counterpart to U.S. Appl. No. 16/835,605, dated Jul. 17, 2020, pp. 1 through 9, Published: WO.

* cited by examiner

METHODS AND SYSTEMS FOR RESOURCE PLANNING IN A SHARED SPECTRA

CROSS-REFERENCE TO RELATED APPLICATIONS

The present application claims benefit of U.S. Patent Application Ser. No. 62/827,460, filed Apr. 1, 2019; the entire contents of the aforementioned patent application are incorporated herein by reference as if set forth in its entirety.

BACKGROUND

Communications networks (such as a typical cellular telephone network) utilizing conventional licensed frequency spectra (or spectra) are designed using network planning tools to ensure satisfactory operation. In such conventional licensed frequency spectra, frequency bands are divided among wireless service providers with typically one provider occupying a given frequency band. Because any given frequency band (or spectrum) is utilized by a single network operator, the network operator has full control of the information to model a communications network operating in a corresponding frequency band. Thus, modelling such an environment is relatively easy.

Spectra usage shared by governmental and commercial users has been proposed, and is expected to be deployed in the future. A multitude of network operator and other users of the shared spectra, known and/or unknown, to a network operator would utilize such shared spectra. For example, the shared spectra usage may dynamically vary by geographic region, frequency band, and time—for reasons outside a network operator's control. As a result, an operator does not have comparable control of the information to model communications networks operating in the shared spectra, making network planning in shared spectra significantly more complex. Therefore, there is a need for a network planning and optimization tool to design communications networks for such shared spectra.

SUMMARY OF THE INVENTION

A method of modelling a radio network in a geographic region utilizing shared spectra is provided. The method comprises: obtaining population data for the geographic region; determining a number of radios per channel in the geographic region, N'; determining candidate geographic location for radios in the geographic region; determining, for every channel in the shared spectra, at least one of a static dataset and a dynamic dataset; wherein the static dataset comprises a set of $n*N'*R$ elements, where n is a number of data types, comprising at least one independent variable and at least one dependent variable, of the static dataset and R is a number of trials to determine the at least one dependent variable using random values of the at least one independent variable, where the data types comprise a first set of radio parameters whose values are randomly selected and a radio transmit power level for a channel, and where the radio transmit power level for the channel is determined so as to distribute interference margin amongst radios in a neighborhood of a protection point or an incumbent user using the randomly selected values of the first set of radio parameters; wherein the dynamic dataset comprises a set of $l*N'*R$ elements, where l is a number of data types, comprising at least one independent variable and at least one dependent variable, of the dynamic data set, where the data types comprise a second set of radio parameters whose values are randomly selected and a move list of radios, operating in the channel, whose transmissions are terminated upon operation of an incumbent system using the channel, and where the move list is determined with the randomly selected values of the second set of radio parameters; and generating at least one set of output data that is a statistical characterization of the radio network, using at least one of the static dataset and the dynamic dataset, to determine at least one of spectrum availability over all geographic regions and likelihood of a radio being placed on a move list over all geographic regions.

DRAWINGS

Figure 2:
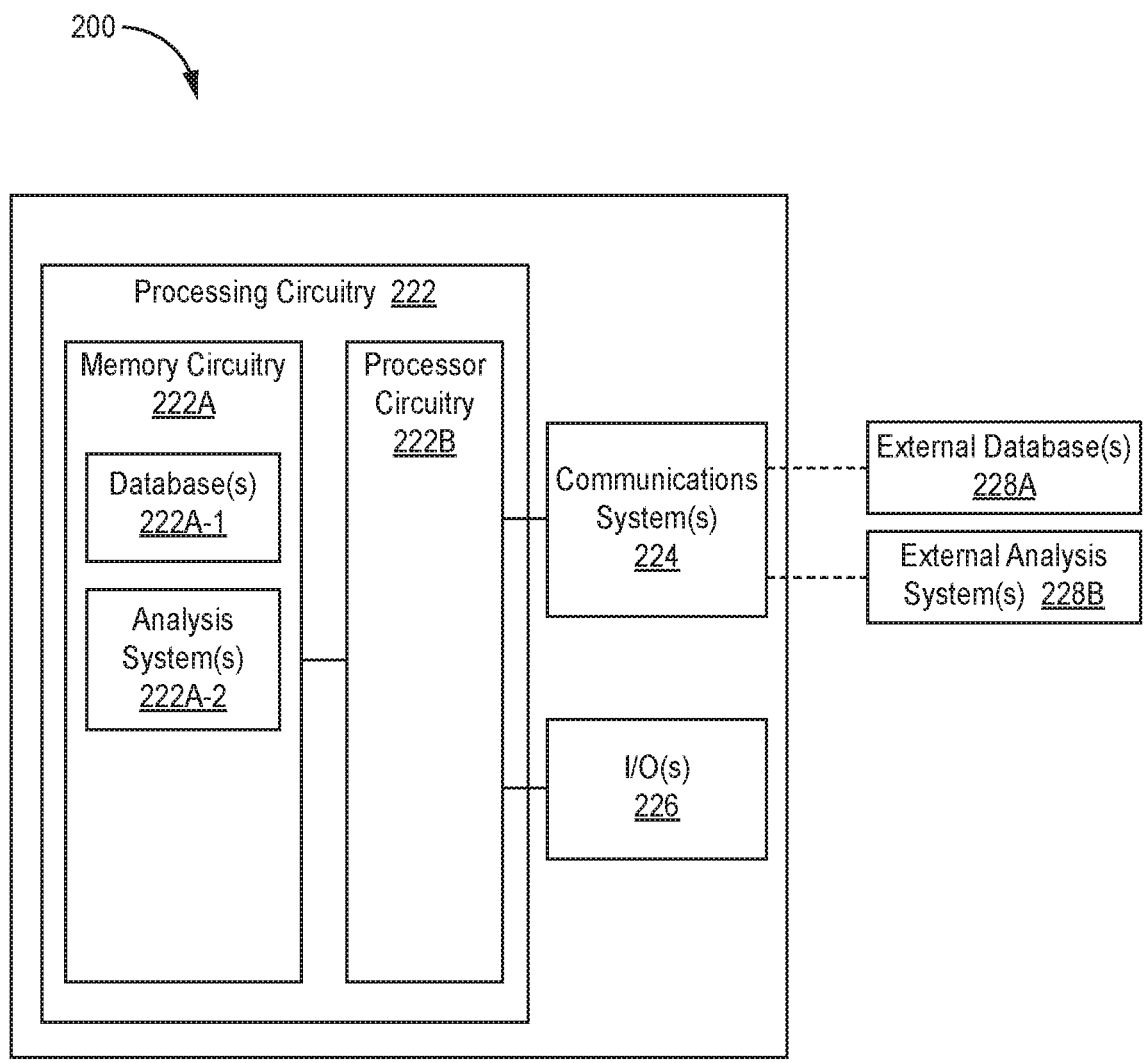

FIG. 1 illustrates one embodiment of a method of modelling a communications network utilizing shared spectra; and FIG. 2 illustrates one embodiment of a shared spectra radio network planning system.

DETAILED DESCRIPTION

Techniques for modelling a shared spectrum environment will be subsequently described. The illustrated techniques improve radio network design systems so that they can model radio systems using shared spectra. First, exemplary shared spectrum technology will be discussed.

An example of a shared access system is the proposed Citizens Broadband Radio Service (CBRS) specified by the United States Federal Communications Commission (FCC). A comparable shared spectrum technology, Licensed Shared Access (LSA), has been proposed in Europe. However, the techniques proposed herein are applicable to any type of shared access system. Further, wherever the term citizens broadband radio service device (CBSD) is used hereafter, it is an example of a radio frequency (RF) access system, or more generally a radio. In one embodiment, an RF access system is a base station, access point, or any other type of radio. The term "channel" may be used to describe a frequency channel or spectrum. The channel, for example, may be 5 or 10 MHz in bandwidth.

A CBRS will initially be described. However, the invention will be subsequently described in more general terms, e.g., using the term radio rather than CBSD of an CBRS.

A CBRS comprises general authorized access (GAA) and/or priority access license (PAL) CBSDs and higher priority users, e.g., incumbent users. The terms system may be used interchangeably with the term user, and shall have the same meaning; thus, e.g., incumbent user means is equivalent to incumbent system. The higher priority users, such as government users for example radar systems, e.g., on ships, have priority access to certain spectrum in the shared spectra. A SAS controller grants the CBSDs access to the shared spectra, including assigning frequency spectrum (or channels) and optionally maximum transmission power. A SAS controller controls the transmission of GAA CBSDs so that they do not interfere with PAL CB SDs and the higher priority users. The SAS controller also controls the transmission of PAL CBSDs so that they do not interfere with the higher priority users.

GAA CBSDs may be of two types: category A (low power) and category B (high power). Category A has a maximum transmission power spectral density of 30 dBm/10 MHz. Category B has a maximum transmission power spectral density of 47 dBm/10 MHz. Power or power level as used herein includes power spectral density.

Incumbent users of shared spectra have first, or highest, priority to utilize the shared spectra controlled by the SAS controller. Thus, incumbent users shall be able to operate free of interference from other users, e.g., communications systems of priority access licensees and general authorized access users. Free of interference as used herein does not mean an absence of interference, but rather means an acceptable level of interference which may be no interference or a finite level of interference. The acceptable level of interference may vary by geography, frequency spectrum, user type, license type, and/or other indicia. In one embodiment, the incumbent users include government entities operating systems such as communications systems, operators of fixed satellite communications systems, and grandfathered, prior licensees of the spectrum. Communications systems, as used herein, shall include radar systems (or radars).

In one embodiment, PAL users have second (or intermediate) priority, after incumbent users, to utilize the frequency spectrum controlled by the SAS controller. In another embodiment, a PAL user shall be able to operate, when incumbent users are free of interference of such a PAL user, free of interference from other priority access licensees and general authorized access users. In one embodiment, an ability of a PAL user to operate free of interference shall be limited temporally, geographically, and spectrally within the specifications of its license.

GAA users have third, or lowest, priority to utilize the frequency spectrum controlled by the CBRS. In one embodiment, an operation of GAA users will be governed by laws, regulations, and/or rules pertaining to the CBRS, e.g., established by governmental(s) and/or standards bodies. For example, such rules shall only let GAA users' CBSDs operate when they do not interfere with communication systems of incumbent and PAL users. Also, for example, such rules shall only let a GAA user's CBSDs operate as long as it does not interfere with another GAA user's CBSD authorized to operate at the same time in the shared frequency spectrum controlled by the SAS controller. As will be subsequently discussed, some GAA users may have priority over other GAA users.

In one embodiment, the geographic coverage area proximate to (e.g., covered by radio frequency emissions of) the CBSD may include exclusion zones and protection zones (including location(s) of fixed satellite service(s) (FSS(s)), priority access license (PAL) protection area(s) (PPA(s)), grandfathered wireless protection zone(s) (GWPZ(s)), and environmental sensing capability (ESC) system(s)). CBSDs are prohibited from operating in specific frequency spectrum in exclusion zones. Further, the level of interference generated by, e.g., by all non-government users and even some government users (including incumbent, PAL, and GAA users) shall be limited in a protection zone so as not to interfere with certain incumbent user(s)' communications systems, for example naval radar on ships, intended to be protected by the protection zone. CBSDs may only operate with the permission of the SAS controller when an incumbent user's communication system is operating in a protection zone. In some cases, this operation will be based upon information received by an environmental sensing capability system, from external database(s), notification from an incumbent user, and/or from a beacon (which will be subsequently described). One type of protection zone is the grandfathered wireless protection zone which is a geographic area and/or frequency spectrum where grandfathered wireless broadband licensees can operate free of interference, e.g., of CBSDs. The foregoing are examples of exclusion zones and protection zones; other type of exclusion and protection zones may occur.

Prioritization of communications systems utilizing shared spectra has been exemplified above in detail. However, embodiments of the invention can be implemented when no prioritization is utilized for communications systems sharing spectra.

Embodiments of the invention will now be described. Such embodiments address the above cited problem by statistically characterizing, for example determining at least one of a probability, mean, or median of spectrum availability in channels of the shared spectra in the geographic region. Thus, statistical characterization means determining a probability of occurrence, a mean, or a median of a variable over a set of trials. Such statistical characterization may be performed, e.g., by running Monte Carlo simulations of radio deployment scenarios, using predictive modeling of shared spectra over a geographic region(s). The statistical characterization is determined for at least one of:

(a) spectrum availability in channels of the shared spectra in the geographic region;
(b) desirable radio parameters for radios operating in a channel and at a geographic location;
(c) for a given channel and geographic location, a radio at a geographic location and operating on a given channel will be on a move list;
(d) for a given channel, geographic locations requiring a priority access license due to proximity of other radios; and
(e) for a given channel, geographic locations where radios require a backup channel to maintain continuity of service. Embodiments of the invention can be used to perform such statistical characterization as market penetration increases, e.g., to aid in planning and determining deployment as the spectra is shared amongst a growing number of users. Market penetration represents a percentage of users (e.g., end user devices utilizing GAA CBSDs) of the corresponding shared spectra as a percentage of the population of the corresponding geographic region being analyzed.

FIG. 1 illustrates one embodiment of a method 100 of modelling a communications network utilizing shared spectra. A communication network as used herein means a network of one or more radios.

In block 102, obtain population data for a geographic region. Optionally, obtain population data for geographic regions from an external database, e.g., from a national governmental entity (for example the U.S. Census Bureau), a commercial, and/or another non-commercial source. Optionally, obtain additionally data for the geographic region such a map data and/or geographic morphology data.

Optionally, the geographic region may comprise one or more larger geographic regions, e.g., counties, towns, and/or cities). The population data for the geographic region may be comprised of population data broken down by the one or more larger geographic regions. Optionally, a larger geographic region may comprise one or more smaller geographic regions, e.g., blocks and/or tracts). The population data for a larger geographic region may be comprised of population data broken down by the one or more smaller geographic regions. Thus, optionally, obtaining the population for data for the geographic region comprising obtaining data for at least one of: at least one larger geographic region, and at least one smaller geographic region comprising one of the larger geographic regions.

In block 104, determine a number of radios per channel in the geographic region. In one embodiment, the number of radios, N, per geographic region is determined where:

$$N = \frac{\text{Population of Geographic Region} * \text{Market Penetration factor} * \text{Channel Factor}}{\text{Number of Users/Radio}} \quad \text{(Equation 1)}$$

If the number of radios per geographic region is a non-integer number, then it is rounded up to ensure that satisfactory network capacity is available for end users, e.g., user equipment that communicate with the radio(s). Other equations for determining the number of radios per geographic region are found in Drocella et al., 3.5 GHz Exclusion Zone Analyses and Methodology, U.S. Department of Commerce, National Telecommunications and Information Administration (NTIA) Report 15-517, 2015-16; the contents of the NTIA Report 15-517 are incorporated by reference herein in its entirety.

The number of users per radio may be determined by a modelling system designer and/or user and will vary based upon geographic morphology (urban, suburban, rural, etc.); the number of users per radio is an estimated number of user equipment served per radio. Typically, higher power radios, e.g., Category B, will serve more users (or user equipment) than lower power radios.

Market penetration factor is a scaling factor representing a percentage of users (e.g., end user devices utilizing GAA CBSDs) of the corresponding shared spectra as a percentage of the population of the corresponding geographic region being analyzed. The market penetration factor can be varied by the modelling system user, and ranges between zero and a positive number, for example one. The channel factor is a scaling factor representing the number of radios expected to share a channel in a geographic region. The channel factor, for example, ranges from zero to one. Further, for example, if there are X radios using channels in shared spectra having a bandwidth $BW_{SS}$ and each channel has a bandwidth $BW_{CH}$, then the number of radios sharing a given channel is $(BW_{CH}/BW_{SS})*X$. The channel factor can be varied by the modelling system user. In other embodiments, other equations for determining the number of radios can be used; for example, a subset of the aforementioned scaling factors may be used. Alternatively, other scaling factors may be used in addition to and/or in lieu of the above described scaling factors.

Determining the number of radios in a geographic region as a whole may not accurately predict locations of radios in the geographic region. Some portions of the geographic region may have higher population densities than others, and thus would require a higher density of radios. Thus, in another embodiment, the number of radios in each larger geographic region forming the geographic region may be determined. The number of radios, $N_{Larger\ Geo.\ Region}$, per channel per larger geographic region may be determined by:

$$N_{Larger\ Geo.\ Region} = \frac{\text{Population of Larger Geographic Region} * \text{Market Penetration factor} * \text{Channel Factor}}{\text{Number of Users/Radio}} \quad \text{(Equation 2)}$$

If the number of radios per larger geographic region is a non-integer number, then it is rounded up to ensure that satisfactory network capacity is available for end users, e.g., user equipment that communicate with the radio(s) in the smaller geographic region. The total number of radios for the geographic region being analyzed is determined by summing the number of radios radio per larger geographic region. Any rounding up is performed before or after such summation; however, performing the rounding up after the summation ensures that there will not be an excessive number of radios in the geographic region.

Determining the number of radios in a larger geographic region as a whole may not accurately predict locations of radios in the geographic region. Some portions of even the larger geographic region may have higher population densities then others, and thus would require a higher density of radios. Thus, in a further embodiment, the number of radios in each larger geographic region forming the geographic region may be determined. The number of radios, $N_{Smaller\ Geo.\ Region}$, per channel per smaller geographic region may be determined by:

$$N_{Smaller\ Geo.\ Region} = \frac{\text{Population of Smaller Geographic Region} * \text{Market Penetration factor} * \text{Channel Factor}}{\text{Number of Users/Radio}} \quad \text{(Equation 3)}$$

If the number of radios per smaller geographic region is a non-integer number, then it may be rounded up (i.e., using a ceil mathematical function) to ensure that satisfactory network capacity is available for end users, e.g., user equipment that communicate with the radio(s) in the smaller geographic region. Whether the number of radios per smaller geographic region is rounded up is contingent upon population density. If the population density (e.g., the population per square kilometer or square mile) in the smaller geographic area is less than a population density threshold level, then rounding up the number of radios computed from equation 3 will result in too many radios than necessary to serve the population in the small geographic area. On the other hand, if the population density is greater than the population density threshold level, then rounding up the number of radios will ensure that the satisfactory network capacity is available for end users in the area. The population density threshold level is determined by implementers of the modelling system or radio system designers, e.g., of shared access systems. The total number of radios for the geographic region being analyzed is determined by summing the number of radios radio per smaller geographic region. Any rounding up is performed before or after such summation; however, performing the rounding up after the summation ensures that there will not be an excessive number of radios in the geographic region.

In yet another embodiment, the number of radios in a geographic region may be determined by determining both: the number of radios in larger geographic regions without determining the number of radios in constituent smaller geographic regions; and the number of radios in larger geographic regions by determining the number of radios in constituent smaller geographic regions. This may be appropriate for a geographic region comprising larger geographic region(s) (e.g., count(ies)) with a rural geographic morphology and uniform population distribution—for which the number of radios is determined based upon data pertaining to only the larger geographic region; and larger geographic region(s) (e.g., count(ies)) with a mixed geographic morphology (e.g., rural and urban) and a non-uniform population distribution—for which the number of radios is determined based upon data pertaining to only the smaller geographic region. Thus, for example in the manner described above, the number of radios is first determined at smaller geographic region(s) for larger geographic region(s) having non-uniform population distributions (which alternatively could apply even to non-mixed geographic morphology such as an urban morphology with a varying population density). The number of radios in the larger geographic regions is then determined by summing the number of radios for corresponding smaller geographic regions. Finally, the number of radios for the geographic region is determined by summing the number of radios for all larger geographic regions constituting the geographic region.

In yet a further embodiment, the geographic region may comprise at least one larger geographic region and at least one smaller geographic region (which is not a constituent of any of the at least one larger geographic region). The number of radios in the geographic region is determined by summing the number of radios in each of the at least one larger geographic region and the at least one smaller geographic region (which is not a constituent of any of the at least one larger geographic region)—for example as illustrated above.

In block 106, determine the candidate geographic locations for the N radios in the geographic region. Candidate geographic location means a point or an area. The candidate locations are constrained so that the distance between radios exceeds the minimum inter-radio distance for the radio having the highest transmit power level of adjacent pairs of radios. The minimum inter-radio distance, and thus any deployment scaling factor, may vary based upon geographic morphology, and/or radio category type (e.g., maximum radio transmit power level). The minimum inter-radio distance—which can range from meters to kilometers—and/or any deployment scaling factor may be defined by the system user, system designer, and/or automatically determined by the system.

The deployment scaling factor is a scaling factor whose unit is candidate geographic locations per radio, and is a positive number which is constrained to guarantee a minimum inter-radio distance (which varies by geographic morphology and the transmit power levels of radios that could be deployed in any of such smaller geographic regions). The minimum inter-radio distance ensures a balance of radio network capacity and inter-radio interference. The deployment scaling factor ensures that the minimum inter-radio distance is satisfied to ensure a more realistic distribution of radios in the analysis. CSGR is determined by rounding up or only using the integer of the resulting product (i.e., applying the floor mathematical function to the product).

The number of candidate geographic locations for each larger geographic region formed by smaller geographic region(s) is the sum of the candidate geographic locations for the corresponding smaller geographic region(s) forming the larger geographic region. The number of candidate geographic locations in the geographic regions is the sum of candidate geographic locations for all larger geographic region(s) in the geographic region, and the sum of all candidate geographic location(s) in the smaller geographic region(s) but not in a larger geographic region(s) in the geographic region.

A number of different ways of determining the number of radios in a geographic region have been illustrate above. The determined number of radios in a geographic region determined by any means including those illustrated above shall be referred to as N'.

In block 108, determine a static dataset, $S''$, and/or a dynamic data set, $M^l$ for every channel in the shared spectra for a geographic region. The static dataset, $S''$, has n dimensions corresponding to n data types. Thus, the static dataset comprises a matrix of $n*N'*R$ elements. R is a number of trials using random values of the independent variables (e.g., Monte Carlo simulation runs). The number of trials should be sufficiently large to generate an average statistical behavior of shared spectrum analytics, e.g., shared spectrum available due to static and dynamic incumbent users in channels of the shared spectra. The shared spectrum analytics, e.g., shared spectrum available due to static and dynamic incumbent users, is dependent upon by the dependent variables of the static and dynamic datasets, e.g., derived from probabilities of spectrum availability and being on a move list. By attaining an average statistical behavior of dependent variables of such datasets, an average statistical behavior of shared spectrum analytics is also attained.

The n data types of the static dataset include a radio transmit power level computed to ensure a fair distribution of the interference margin and a first set of radio parameters used to determine the radio transmit power level. One embodiment of the fair distribution of the interference margin is the Iterative Allocation Process (IAP) as described by WInnForum and discussed below. The radio transmit power level is a dependent variable determined based upon the first set of radio parameters which are independent variables. Thus, the radio transmit power level is determined using the first set of radio parameters. In one embodiment, the values of the first set of radio parameters are randomly selected for each R runs to determine the radio transmit power level in each set of $n*N'$ elements of the static data set of the corresponding run.

In IAP, the radio transmit power level is determined using an iterative process such that the first set of radio parameters ensure that the cumulative interference at a protection point from radios in a neighborhood of a protection point remain below a first threshold power level, e.g., determined by law or regulation. A neighborhood is an area, e.g. a circle, square, or other shape, centered around the corresponding protection point. However, other techniques may be used. WInnForum Shared Access System (SAS) general requirement (requirement) R2-SGN-16 of WINNF-TS-0112 defines the IAP, and is hereby incorporated by reference herein in its entirety. The IAP determines such maximum transmit power levels by allocating interference margin fairly to radios in neighborhood(s) of protection point(s) proximate to the radios. The IAP determines such transmit power levels by allocating interference margin fairly to radios in neighborhoods of protection point(s), e.g., of one or more of each of a location of a fixed satellite service, a location of a priority access license protection area, a grandfathered wireless protection zone, and location(s) of environmental sensing capability system(s).

Optionally, after performing IAP, determine if the transmit power level of any radio in a channel is below a second threshold power level for the corresponding radio type (for example higher power radios may have a higher power threshold than lower power thresholds). This embodiment considers a practical deployment model where operators may not deploy radio if a radio's transmit power is significantly diminished. By removing radios with significantly diminished transmit power, the permitted transmit power of other, remaining radios surrounding protection point(s) can be more accurately determined. In one example, the second threshold power level is 3 dB below the maximum transmit power level of the corresponding radio. If any radios have a determined transmit power level below a corresponding second threshold power level, then using the randomly selected values of the first set of radio parameters the IAP is performed again for radios determined to have a power level equal to and/or greater than the corresponding second threshold power level. This technique eliminates radios from a set of n*N' elements of the static dataset corresponding to the unique values of the first set of radio parameters used for the IAP. Such radios are eliminated because they are too close to a statically operating incumbent user (exemplified above), and their removal allows remaining radios in the corresponding set of n*N' elements to operate at higher power levels.

The dynamic data set, $M^l$, has l dimensions corresponding to l data types. Thus, the dynamic dataset comprises a matrix of l*N'*R elements.

The l data types of the dynamic dataset forming each dimension include a move list of radios whose transmission in a shared channel are terminated upon operation of an incumbent system using the shared channel. The move list is a dependent variable determined based upon the second set of radio parameters which are independent variables. Thus, the move list is determined using the second set of radio parameters. In one embodiment, the values of the second set of radio parameters are randomly selected for each R runs to determine the move list in each set of l*N' elements of the dynamic dataset of the corresponding run.

The move list is a list of radios whose transmission in the corresponding channel must cease upon an incumbent user utilizing the channel. Generation of the move list is specified in the WInnForum requirement identified above. An incumbent user is a dynamic user of a channel, such as a government entity (e.g., naval radar on a ship), that has preference to use the channel over the radios, e.g., PAL and GAA CBSDs. Other data types may be used in addition to or in lieu of one or more of the data types specified above for the static dataset and/or the dynamic dataset.

The first and second set of radio parameters may or may not be the same. Each set of radio parameters may include parameters such as radio geographic location, maximum radio transmission power (e.g., corresponding to radio category), antenna height, antenna azimuth angle, antenna gain, antenna radiation polarization, antenna radiation angle, antenna tilt angle, and/or antenna ground plane data; however, other radio parameters may be used in addition to or in lieu of the illustrated radio parameters.

The random selection of the values of the first and second set of radio parameters may be accomplished by performing R runs of Monte Carlo analysis. The static and dynamic datasets for each channel in a geographic region are populated by generating a probabilistic distribution of the different data types, e.g., using Monte Carlo analysis. The radio geographic location is limited to the previously determined candidate geographic locations. Optionally, the number of radios with higher or highest maximum radio transmission power (e.g., corresponding to radio category) is constrained by the type of geographic morphology of the corresponding geographic region or its constituent geographic regions; for example, rural morphologies may have more higher power radios, subject to maintaining a corresponding minimum inter-radio distance, than an urban morphology of the same area. Optionally, the value of some or all of the radio parameters may be constrained within a range(s) or set(s) selected by the system user or designer.

In block 110, generate at least one set of output data that is a statistical characterization of the radio network, using at least one of the static dataset and the dynamic dataset, to determine at least one of spectrum availability over all geographic regions and likelihood of a radio being placed on a move list over all geographic regions. Optionally, the at least one generated output set may be used to design of at least one radio network using shared spectra. In one embodiment, generating the at least one set of output data comprises generating output data that statistically characterizes parameters of the radio network as market penetration increases. In another embodiment, the at least one data output comprises at least one of:

a) a probability of spectrum availability in channels of the shared spectra in the geographic region;
b) desirable radio parameters for radios operating in a channel and at a radio geographic locations;
c) for a given channel and geographic location, a probability that a radio at that radio geographic locations and operating on that given channel will be on a move list;
d) for a given channel, radio geographic locations requiring a priority access license due to proximity of other radios;
e) for a given channel, radio geographic locations where radios require a backup channel to maintain continuity of service;
f) for a given channel, analyzing the first set of radio parameters that give rise to a, e.g., low, probability of spectrum availability so that a user, e.g., a network operator, can determine if the probability arises primarily due to a corresponding radio geographic location's proximity to a static incumbent user or due to another radio parameter (other than transmit power and radio geographic location); and
g) for a given channel, analyzing the second set of radio parameters that give rise to a, e.g., high, probability of a radio being placed on a move list so that a user, e.g., a network operator, can determine if the probability arises primarily due to one or more radio parameters (other than the corresponding move list).

However, additionally or in lieu of one or more of the foregoing, other analyses useful to designing radio networks using shared spectra may be generated. In one embodiment, the path loss or interference data collected in the dataset S'', for all radio geographic locations, over iterations R, can be used to build a radio map of the frequency band, e.g., the CBRS frequency band of 3550 MHz to 3700 MHz. The radio map would identify the maximum possible power transmission at the radio geographic locations independently without any consideration for aggregation of interference power from all radios in the neighborhood. For example, if a radio at a geographic location causes interference proximate to (e.g., within 1-3 dB), a first threshold power level the radio likely will have to reduce radio transmit power level or will be placed in a move list.

A map of such radio geographic locations susceptible to having transmit power level reduced or being placed on a move list can be generated and made available to system users (e.g., engineers who plan radio deployment, network operators, and/or site survey personnel) for consideration when they designed radio networks including locations of radios. The map may also contain information, for such radio geographic locations, about the impact of incumbent users(s) represented by protection point(s). The incumbent impact information may be generated based upon attributes of the radio, e.g., antenna height, antenna azimuth, radio transmit power, etc. The incumbent impact information may be stored in a database. The incumbent impact information may be generated for incumbent user(s) whose operation is either static or dynamic. The incumbent impact information may be a score computed for the different radio geographic locations and saved in the database. The incumbent impact information or score may represent a level of impact by a radio at radio geographic location on the incumbent user(s). For example, a higher score implies that a radio at the radio geographic location is more highly influenced by the incumbent user(s), and thus more likely to have its transmit power reduced or to be placed on a move list. The incumbent impact information or score may be represented on the map (and may displayed to a user) using different colors, e.g., transitioning from no color to shades purple to shades of red as illustrated below corresponding to regions of lower to higher impact. The mapping techniques described herein are improvements to a technological system for modeling deployment of radios because they more efficiently identify to a user of the modelling system what preferential action should be taken, e.g., where radios are preferably deployed on the map or where a PAL license should be purchased. Other color schemes can be used for the mapping described above and elsewhere herein. Further, other indicia, e.g., textual symbols can be used to distinguish different regions on a map, e.g., desirable and undesirable regions on a map. In lieu of a map, data representative of mapped information may be generated in tabular form using numerical or alphanumeric representations for location and corresponding values, and may be stored in one or more data files and/or databases. Such tabular form data may be used by other design tools.

One embodiment of the use of the radio map is to provide guidance in selecting radio deployment sites. The system may utilize an interface, e.g. a user could identify a desired deployment location through the interface and obtain through the interface a score for the location. The interface could also provide the conditions (antenna height, antenna azimuth, radio transmit power, etc.) under which a radio deployed at the location would not significantly impact static or dynamic incumbent user(s). When the system user provides additional installation parameters along with the desired location, the interface can be used to provide a better design criterion or a tailored result. One example would be the antenna azimuth information for the desired location could be provided by the user to the interface. The interface would then provide the likely antenna heights at which the radios could be deployed to minimize the impact to the incumbent user(s).

In the case where the desired location is not in the database, one method would be to use the closest location for extrapolating the results. Other techniques like averaging, interpolating between the data points can also be used. One technique to measure the radio's impact to a static incumbent user(s) is the extent of reduction to the desired transmit power of the radio. The more there is a reduction in allowable transmit power, the greater is the impact of the radio on the incumbent user(s). In the dynamic incumbent user case, the probability of the radio being on the move list would be the measure for evaluating the impact of the radio on the dynamic incumbent user.

In one embodiment, spectrum availability in the shared spectra in the geographical region may be determined by calculating a spectrum availability probability, PSA, for the geographic region (e.g., on a larger geographic region and/or a smaller geographic region basis) and channel. For example, spectrum availability probability for each geographic location of radios for a given channel is:

$$PSA = |\{x \varepsilon S^i | x > Th\}|/(N'^* R), \quad \text{(Equation 4)}$$

where $|\{x \varepsilon S^i | x > Th\}|$ means a cardinal number of radios created during the R runs determined to have a transmit power level above a third threshold power level Th, and for a corresponding, e.g., 10 MHz, channel. The channel bandwidths illustrated herein are exemplary and can be smaller or larger. The third threshold power level, for example, may be 3 dB below maximum power level of the corresponding radio. PSA=0 if the corresponding radio is located in an exclusion zone where radios are prohibited. Exclusion zones are comprised, e.g., of protection point(s), and may result from any of the systems or regions described above with respect to protection points.

The spectrum availability probability for a channel can be overlaid upon a map of the geographic region to visually illustrate the probability. For example, the following color mapping can be used to visually illustrate the spectrum availability probability:

| Spectrum Availability Probability Range | Description | Color |
| --- | --- | --- |
| $P_{SA} = 0$ | Not Available | Purple |
| $0 < P_{SA} < 10\%$ | Least Available | Red |
| $10\% \leq P_{SA} < 50\%$ | Less Likely Available | Orange |
| $50\% \leq P_{SA} < 90\%$ | Likely Available | Yellow |
| $90\% \leq P_{SA} < 100\%$ | Most Likely Available | Green |
| $P_{SA} = 100\%$ | Available | no color |

The colored map may be displayed to a user, and is an improvement to a system for modeling deployment of radios because it more efficiently identifies where radios are preferably deployed on the map, e.g., where the availability of spectrum is high.

However, other schemes, e.g., other spectrum availability probability ranges and color combinations, can be used to visually illustrate the probability for the channel on a map of the geographic region. Geographic locations of radios in the geographic region (for a specific channel) having a relatively high spectrum availability probability, e.g., greater than 50% or 90%, may be considered by a radio network operator as desirable geographic locations for additional radios to be installed in the near term or future.

In one embodiment, the probability that a radio at a geographic location will be on a move list for a given channel (where a dynamic incumbent system may operate) may be determined by calculating a move list probability, PM, for the geographic region and channel of an incumbent system whose operation causes transmissions of radios—on their authorized channels in the shared spectra—to cease. For example, if the incumbent system is naval radar on a ship, the incumbent system's channel is 10 MHz. For example, move list probability for each geographic location of a radio and channel is:

$$PM = |M^i|/(N'^* R), \quad \text{(Equation 5)}$$

where $|M^i|$ means a cardinal number of radios of all move lists created during the R runs and for a corresponding, e.g., 10 MHz, channel.

The move list probability for a channel can be overlaid upon a map of the geographic region to visually illustrate the probability. For example, the following color mapping can be used to visually illustrate the move list probability:

| Move List Probability Range | Description | Color Code |
| --- | --- | --- |
| Pm = 0% | Not likely in move list | no color |
| 0% < Pm < 10% | Least Likely | Green |
| 10% ≤ Pm < 50% | Less Likely | Yellow |
| 50% ≤ Pm < 90% | Likely | Orange |
| 90% ≤ Pm < 100% | Highly Likely | Red |
| Pm = 100% | Always in the move list | Purple |

The colored map may be displayed to a user, and is an improvement to a system for modeling deployment of radios because it more efficiently identifies where radios are preferably deployed on the map, e.g., where the likelihood that a radio will be placed on a move list is low.

However, other schemes, e.g., other move list probability ranges and color combinations, can be used to visually illustrate the move list probability for the channel on a map of the geographic region. Geographic locations of radios in the geographic region (for a specific channel) having a relatively high move list probability, e.g., greater than 50 or 90%, may be considered by a radio network operator as undesirable geographic locations for additional radios to be installed in the near term or future. In one embodiment, desirable geographical locations and/or installation parameters for radios operating in a frequency channel and located in the geographical regions can be implemented by identifying radio parameters corresponding to set of R*n*N' elements and set of R*1*N' elements of both the static and dynamic datasets that result in relatively high spectrum availability probability, e.g., greater than 50% or 90%, and a relatively low move list probability, e.g., less than 50% or 10%. Although certain probability ranges are illustrated herein, other ranges may be used.

In one embodiment, for a given channel, analyze the second set of radio parameters that give rise to, e.g., a high probability, of a radio being placed on a move list so that a user, e.g., a network operator, can determine if the probability arises primarily due to one or more radio parameters (other than the corresponding move list). For example, such analysis can determine a correlation between one or more radio parameters, e.g., location and maximum radio transmit power, and an increased probability that a radio location is placed on the move list. The correlations can be displayed in a map or in tabular format in the manners described elsewhere herein for displaying other types of data. Such correlations can be used to aid in planning future radio deployments, such as changing parameters of radios whose deployment is being planned, in a geographic region, and to determine whether the network operator needs to depend upon another spectrum, e.g., a licensed spectrum, for continuity of service.

For a potential radio site in an area having a relatively low spectrum availability probability across a frequency band (e.g., the CBRS frequency band), e.g., less than 50% or 10%—for each specific channel, the method may suggest that a network operator should consider procuring, e.g., purchasing, a priority access license (PAL) for a radio at a geographic location to ensure access to the specific channel at the geographic location. The need for a priority access license may arise if there is a high density of radios, e.g., GAA CBSDs, in that area in a geographic region. The method for evaluating the recommendation for procuring a PAL in a geographic region would evaluate the impact of one or more radios on the incumbents individually and in an aggregate sense. The individual impact evaluation checks if the radio has an interference power at the incumbent that exceeds a first threshold, e.g., −109 dBm/MHz in the case of ESC incumbent. The aggregate impact analysis performs a new spectrum availability probability analysis, as defined in equation 4, by using a PAL radio deployment, as described below. A score (PAL Impairment County Score is generated to indicate the level of impairment on the PAL channels for a larger geographic region, e.g., a county, where a PAL is desired, as described in the subsequent section. The impairment is a measure of the impact on PAL radios due to protection requirement for the static or dynamic incumbents, for example the operational power of radios with PAL license may be restricted to a value below a threshold power, e.g., 30 dBm/MHz for category B and 20 dBm/MHz for category A, due to static incumbents, or that the radio with PAL license may have a probability of being placed on move-list above a probability threshold, e.g., a probability of 0.60 due to dynamic incumbent. The PAL impairment score can a continuous range of numbers from lowest, e.g., 0, which indicated least amount of impairment, to the highest value, e.g., 10, which indicates a substantial impairment on PAL radios; alternative numerical ranges can be used. Optionally, PAL impairment score is assigned per county when PALs are issued for an entire county area. For pedagogical purposes, this score per county embodiment will be subsequently exemplified; however, the score may be based upon any region to which a PAL is assigned. The PAL Impairment County Score (PICS) consists of 2 underlying scores: a county-static PAL channel impairment score (C-SPCIS) and a county-dynamic PAL channel impairment score (C-DPCIS). A method, described below, provides the user with the PICS, C-SPCIS and the C-DPCIS scores for a county.

The county-static PAL channel impairment (CSPCI) score represents the PAL channel impairment for a county based on the static incumbent analysis. A high PAL impairment score, e.g. 10, means radios in the geographic region operating on the PAL channels will not be able to transmit above or at the threshold operational power, e.g., 30 dBm/MHz for category B and 20 dBm/MHz for category A, while a low PAL impairment score, e.g., 0, means radios in the geographic region operating on the PAL channels will be able to transmit at least at threshold operational power.

The county-dynamic PAL channel impairment (CDPCI) score represents the PAL channel impairment score for a county based on the dynamic incumbent analysis. PAL impairment in this context means a high probability of being on the move-list for radios transmitting on the PAL channel. A high PAL impairment score means radios in the geographic region operating on the PAL channel have a high probability of being on the Move List (ML), while a low PAL impairment score means radios in the geographic region operating on the PAL channel have a lower probability to be on the ML.

Estimating County Static PAL Channel Impairment Score (CSPCI)

For a given county of interest, an estimated CSPCI score can be determined as the sum of the subcounty static PAL channel impairment, SSPCI, scores of the sub counties within a county of interest. For each subcounty, the first step is to assess the spectrum availability probability, PSA exemplified in equation 4, using the static dataset, $S''$, for each PAL channel, where a binary classification is made based on the spectrum availability probability, i.e. high or low spectrum availability. For example, if for a PAL channel in a sub-county the probability of spectrum availability is above a threshold, example 0.60, then the spectrum availability for the PAL channel is considered high, otherwise it is considered a low spectrum availability PAL channel.

PAL channels are divided into two groups, ones having high spectrum availability and the remaining PAL channels with low spectrum availability, where low and high spectrum availability have been described elsewhere herein. For the subset of PAL channels having high spectrum availability, a PAL channel impairment score (PCIS) is assigned a low value, e.g. the value 0. For the subset of PAL channels with low spectrum availability, a PCIS score will be determined based on whether the radio's low spectrum availability is caused by aggregation-type or single-exposure-type interference (to incumbents). A single-exposure-type classification means that the low spectrum availability is caused by the radio parameters of each radio, i.e., without aggregation, or even when there is low density radio deployment, while an aggregation-type classification means that the low spectrum availability is due to the aggregation of interference from all of the radios in the subcounty, i.e., due to high density radio deployment. Optionally, the interference classification may be obtained from a function of the radio and interference parameters of the set of deployed radios within the subcounty. The function will return a value 1 to indicate an aggregation-type power adjustment cause, or a 0 to indicate single-exposure-type power adjustment cause. The following is a description of such an embodiment.

For the set C of all radios deployed within the smaller region, e.g., subcounty, determine a first subset of radios within the set C, C', which consists of the subset of radios with adjusted power that is in excess a Power Adjustment Threshold, e.g. 7 dB. From the subset of radios determine the subset of radios C" that have an interference power to their associated minimum protection point that exceeds an Interference to Minimum Protection Point Threshold, e.g., −90 dBm/MHz. If the ratio |C"|/|C| is greater than Single Exposure Ratio Threshold, e.g., 0.5, then return 1, otherwise it returns a 0. Therefore, a returned value 1 corresponds to low spectrum availability due to the radio parameters of each radio, i.e., not due to high-density radio deployment, while a returned value of 0 indicates a low spectrum availability due to the aggregation of interference due to of high-density radio deployment in the set C. The function described above is herein referred to as F. The mathematical operator | | in the ratio corresponds to the cardinality value, or number of elements, of the enclosed set.

When the output of the function F is 1, i.e., indicating aggregation-type, a second instance of probability of spectrum availability, P'SA_m, evaluation is conducted for mth PAL channel, e.g., for channels 1 to 10, where PAL radio deployment will be modeled in a constituent region, e.g., the subcounty. Since the presence of PAL radios in a subcounty will result in reduction of the deployment density of radios, specifically GAA radios (due to removal of GAA radios from PAL Protection Areas (PPAs)), the aggregate interference to impacted incumbents in the subcounty will be changed, and thus the spectrum availability due to PAL presence may correspondingly change. A metric of the mth PAL channel, PAL_ChanImpairment$_{PALsubCounty_m}$, where m is one of the PAL channels, in the subcounty, is defined as a function of probability of spectrum availability in the mth PAL channel in the subcounty, P'SA_m. The PAL_ChanImpairment$_{PALsubCounty_m}$ metric may be assigned a binary value of 0 when second probability of spectrum availability (P'SA_m) of the mth PAL channel is high, or a value 1 when the second probability of spectrum availability of the mth PAL channel is low. To summarize in equation form, the above described PAL channel impairment function for mth PAL channel in a subcounty is:

$$\text{PAL\_ChanImpairment}_{PALsubCounty_m} = \begin{cases} 0, \text{ when second spectrum availability,} \\ \quad P'SA\_m, \text{ for } mth \text{ chan } PAL \text{ is high} \\ 1, \text{ when second spectrum availability,} \\ \quad P'SA\_m, \text{ for } mth \text{ chan } PAL \text{ is low} \end{cases} \quad \text{(Equation 4)}$$

Alternatively, the mth PAL channel metric, PAL_ChanImpairment$_{PALsubCounty_m}$, may map to a continuous value, e.g., 0.01 to 0.99, as a function of the second instance of probability of spectrum availability, P'SA_m, of the mth PAL channel as follows:

$$\text{PAL\_ChanImpairment}_{PALsubCounty_m} = 1 - P'SA\_m(\text{for } mth \text{ PAL chan}) \quad \text{(Equation 7)}$$

To determine the PAL channel impairment score for a subcounty for all PAL channels, the sum of PAL_ChanImpairment$_{PALsubCounty_m}$ values for all M PAL channels is computed, which is expressed in equation form as:

$$\text{Pal Channel Impairment for Subcounty } (PCIS) = \sum_{m}^{M \text{ PAL channels}} \text{PAL\_ChanImpairment}_{PALsubCountyChan_m} \quad \text{(Equation 8)}$$

For example, if for a subcounty it is determined that available bandwidth is determined as SA$_{PALsubCountyChan_m}$=1,1,1,1,1,1,0,0 for m=1 to 8, respectively, then PCIS=6 for this subcounty. In another example, for another subcounty SA$_{PALsubCountyChan_m}$=0,0,0,0,0,0,0,0 for m=1 to 8, respectively, then PCIS=0.

The County Static PAL Channel Impairment (CSPCI) score for the county can be determined as a function of the Subcounty Static PAL Channel Impairment, SSPCI, scores in the county. In one embodiment the function may be the weighted sum of the individual subcounty SSPCI$_n$, where n is the index of nth subcounty, score, as follows:

$$\text{CSPCI} = \sum_{N}^{numSubCountyInCounty} w_n * \text{SSPCI}_n \quad \text{(Equation 9)}$$

where each weight $w_n$ is determined as a function of the subcounty population ratio to the total county population, i.e.:

$$w_n = \frac{(\text{population of } nth \text{ subcounty})}{\text{total County Population}}, \quad \text{(Equation 10)}$$

where a subcounty may be a geographic region of a set of adjacent census tracts, or a region that may include entire or partial census tracts. Alternatively, the weight can be determined from the ratio of the number of radios deployed in a subcounty to the total number of radios in the county in which the subcounty is located, i.e.:

$$w_n = \frac{(\text{number of } CBSDs \text{ deployed in } nth \text{ subcounty})}{\text{total number of } CBSD \text{ in county}} \quad \text{(Equation 11)}$$

For example, if a county has a high computed SCPCI score, e.g., 10, then a PAL will be highly likely to be impaired within this county. On the other hand, if a county has a low SCPCI score, e.g., 0, then a PAL will be highly likely to be not impaired in this county.

Estimating County Dynamic PAL Channel Impairment (CDPCI) Score

For a given county of interest, an estimated CDPCI score can be determined as the sum, or weighted sum, of the subcounty dynamic PAL channel impairment, SDPCI, scores of the sub-counties in a county of interest. For each subcounty, the first step is to assess the move list probability using the dynamic dataset $M^I$. Unlike Static PAL impairment analysis, when computing move-list probability there is no distinction between PAL channels since the impact on the incumbent is equal across all PAL channels, therefore, the estimated move-list probability applies equally to all PAL channels.

The initial estimate of move-list probability for the geographic region, or sub-county, is compared to a probability threshold, e.g., 0.6, and if the probability is below the threshold, then the Dynamic PAL impairment is assigned a low value, e.g., 0. If, on the other hand, the estimated move-list probability is above the probability threshold, high move list probability, then the next step is to determine whether the cause of high move-list probability is due to aggregation of interference from high density radios in the subcounty or if it is due interference levels from individual radios above the DPA's protection threshold, e.g., −144 dB/MHz, at the associated DPA's protection points. The former interference case is referred to as aggregation-type, while the latter is referred to as the single-exposure-type. The cause of high move-list probability may be determined as by the following steps:

- For a set C of all radios located in the subcounty, determine a subset of radios C', which consists of the radios having interference power at any associated protection point in the neighboring DPA that is greater than a protection threshold, e.g., −144 dBm/MHz;
- Next, determine a ratio |C'|/|C|, where |C'| and |C| represents the cardinal value of the set C' and the set C, respectively; and
- If the determined ratio |C'|/|C| is greater than a ratio threshold, e.g., 0.5, then the high move-list probability is classified as the single-exposure-type case, otherwise the cause is classified as the aggregation-type case.

If single exposure interference is determined as the cause of high move-list probability, then the PAL impairment score will be set to a high value, e.g., 10, otherwise, a second instance of move-list probability estimation is conducted, where PAL radios are located in the subcounty. The second instance move list probability is determined in a manner similar to the move list determination as described earlier with PAL radios being present in the subcounty. Since the presence of PAL radios in a subcounty will result in reduction of the deployment density of radios, specifically GAA radios (due to removal of GAA radios from PAL Protection Areas (PPAs)), the aggregate interference to impacted incumbents in the subcounty will be changed, and therefore the move list probability due to PAL radios' presence may correspondingly change. If the estimated second instance move-list probability is above a threshold, e.g., 0.6, then the PAL impairment score will be set to a high value, e.g., 10, otherwise the score will be set to a low value, e.g., 0. Alternatively, the PAL impairment score may be determined as a continuous range from lower end to the higher end as a function of the second instance move-list probability estimate, specifically it may be directly proportional to the second instance move-list probability such as PAL impairment score=(10.0*the second instance move-list probability estimate). For example, when second instance move list probability is 0.5, the PAL impairment score=10.0*0.5=5.

The CDPCI score for the county can be determined as a function of the dynamic subcounty PAL channel impairment scores in the county. In one embodiment the function may be the weighted sum of the individual subcounty, $SDPCI_n$, where n is the index of the nth subcounty, score, as follows:

$$CDPDI = \sum_{n}^{numSubCountyInCounty} w_n * SDPCI_n \quad \text{(Equation 12)}$$

In one embodiment the function may be the weighted sum of the individual subcounty scores where each weight is determined as a function of the subcounty population ratio to the total county population, i.e.:

$$w_n = \frac{\text{(population of } nth \text{ subcounty)}}{\text{total County Population}}, \quad \text{(Equation 13)}$$

where a subcounty may be a geographic region of a set of adjacent census tracts, or a region that may include entire or partial census tracts. Alternatively, the weight can be determined from the ratio of the number of radios deployed in a subcounty to the total radios in the county, i.e.:

$$w_n = \frac{\text{(number of } CBSDs \text{ deployed in } nth \text{ subcounty)}}{\text{total number of } CBSD \text{ in county}} \quad \text{(Equation 14)}$$

For example, if a county has a computed high CDPCI score, e.g., 10, then a PAL will be highly likely to be impaired within this county. On the other hand, if a county has a low CDPCI score, e.g., 0, then the PAL will highly likely not be impaired in this county.

Optionally, the operator can use the static analysis and dynamic analysis-based PAL channel impairment scores, CSPCI and CDPCI, separately to help decide whether he wants to bid for the PAL for a particular county. Optionally, the operator can choose to retrieve a combined overall PAL impairment score for the county of interest that is a weighted sum of the static and dynamic analysis metrics. The static analysis metric can be weighted more than the dynamic analysis metric since the impact of the static incumbents is always present while the DPA activation is sporadic. The colored map may be displayed to a user of the combined overall PAL impairment score, the static PAL impairment score, and/or the dynamic PAL impairment score, and is an improvement to a system for modeling deployment of radios because it more efficiently identifies where it is more beneficial to purchase a PAL for a radio, e.g., where PAL impairment will be low.

FIG. 2 illustrates one embodiment of a shared spectra radio network planning. system 200. The illustrated shared spectra radio network planning system 200 comprises a processing circuitry 222. The processing circuitry may be a state machine, a neural network, and/or any other type of processing circuitry; for pedagogical reasons, processing circuitry is illustrated herein one form of a state machine.

Optionally, the processing circuitry 222A is communicatively coupled to at least one input/output device (I/O(s)) 226. Optionally, the processing circuitry 222A is coupled to at least one communications system (communications system(s)) 224. For pedagogical purposes, the shared spectra radio network planning system 200 will be illustrated with such external components not being part of the radio network planning system 200.

The processing circuitry 222 principally performs a planning function for a network of one or more radios that utilize shared spectra. The communications system 224 facilitates communications between the processing circuitry 222 and external components, e.g., at least one external database (external database(s) 228A and/or at least one external analysis system (external analysis system(s)) 228B. Such external components will be subsequently discussed. The communications system 224 comprises communications circuitry such as Internet modem circuitry and/or radio circuitry.

Additionally or alternatively, the communications systems 224 can be used to communicatively couple remote user(s) to the shared spectra radio network planning system 200; in such an event, the shared spectra radio network planning system 200 may not require the I/O(s) 226. Such remote user(s) are located at a distance from the shared spectra radio network planning system 200, and may be person(s) and/or computer system(s).

The I/O(s) 226 are man machine interfaces that a user, such as a person, to interact with the shared spectra radio network planning system 200. The I/O(s) 226 may comprise a keyboard, a mouse, a joystick, a microphone and/or a voice recognition system, a touch screen display, a non-touch screen display (e.g., an LCD or OLED display), and/or a speaker and/or a voice synthesizer.

In the illustrated embodiment, the processing circuitry 222 includes processor circuitry 222A coupled to memory circuitry 222B. In the illustrated embodiment, the memory circuitry 222A includes at least one database (database(s)) 222A-1 and at least one analysis system (analysis system(s)) 222A-2. The analysis system(s) 222A-2 are executed by the processor circuitry 222B to model a communications network that utilizes shared spectra, e.g., utilizing the method illustrated above. However, some of the modelling, for example, determination of radio transmit power level and/or move lists can be performed by external analysis system(s) 228B, e.g., by IAP analysis system(s) in shared access system(s); for example, such shared access system(s) may already control radios utilizing the shared spectra and located in the geographic region being modelled.

The analysis system(s) 222A-2 and/or the external analysis system(s) may include propagation modelling system(s) which estimate electromagnetic energy radiated by a radio's antenna at geographic location(s) and/or over geographic region(s). The propagation modelling system(s) may include one or more types of RF propagation models, which describe path loss, over geographic region, of signals emitted by radio(s) under different propagation conditions. The selection of a propagation model depends upon frequency spectrum, the propagation path (e.g., including distance, geographical terrain, morphology, and physical obstructions such as buildings), antenna characteristics (e.g., angle of radiation and radiation polarization), potential atmospheric conditions (e.g., ionospheric conditions and the existence of meteor showers), and/or time (such as time of day of operation of the radio(s) and/or solar cycle data). The propagation models may be public and/or proprietary models. Examples of propagation models include the Hata model, the Longley-Rice model, and variations thereof.

The database(s) 222A-1 store data used to perform the modelling and/or data generated by the modelling. However, optionally, some of such data may be stored, at least in part, in external database(s) 228A, such as population data for geographic regions stored in database(s) at the U.S. Census Bureau, geographic morphology data stored in database(s) at the U.S. Geological Survey, map data stored in database(s) at map data providers such as Google, and/or data about existing radio networks, incumbent user(s)/system(s), and priority access licensee radios in or near a geographic region and using the shared spectra being modelled which may be stored in database(s) at the U.S. Federal Communications Commission, National Telecommunications and Information Administration, and/or shared access system(s); for example, such shared access system(s) may already control radios utilizing the shared spectra and located in the geographic region being modelled. Some data in the database(s) 222A-1 may be entered by the user or may be implemented by the system as described elsewhere herein. Data used to perform the modelling, includes the population data for geographic regions, The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk—Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium and executed by the processor circuitry. Generally, program modules or applications include routines, programs, objects, data components, data structures, algorithms, and the like, which perform particular tasks or implement particular abstract data types.

Databases as used herein may be either conventional databases or data storage formats of any type, e.g., data files. Although separate databases are recited herein, one or more of such databases may be combined.

Exemplary Embodiments

Example 1 includes a method of modelling a radio network in a geographic region utilizing shared spectra, comprising: obtaining population data for the geographic region; determining a number of radios per channel in the geographic region, N'; determining candidate geographic location for radios in the geographic region; determining, for every channel in the shared spectra, at least one of a static dataset and a dynamic dataset; wherein the static dataset comprises a set of n*N'*R elements, where n is a number of data types, comprising at least one independent variable and at least one dependent variable, of the static dataset and R is a number of trials to determine the at least one dependent variable using random values of the at least one independent variable, where the data types comprise a first set of radio parameters whose values are randomly selected and a radio transmit power level for a channel, and where the radio transmit power level for the channel is determined so as to distribute interference margin amongst radios in a neighborhood of a protection point or an incumbent user using the randomly selected values of the first set of radio parameters; wherein the dynamic dataset comprises a set of l*N'*R elements, where l is a number of data types, comprising at least one independent variable and at least one dependent variable, of the dynamic data set, where the data types comprise a second set of radio parameters whose values are randomly selected and a move list of radios, operating in the channel, whose transmissions are terminated upon operation of an incumbent system using the channel, and where the move list is determined with the randomly selected values of the second set of radio parameters; and generating at least one set of output data that is a statistical characterization of the radio network, using at least one of the static dataset and the dynamic dataset, to determine at least one of spectrum availability over all geographic regions and likelihood of a radio being placed on a move list over all geographic regions.

Example 2 includes the method of Example 1, wherein the determined at least one of spectrum availability over all geographic regions and the determined likelihood of a radio being placed on a move list over all geographic regions are displayed as a map of geographic region and using different indicia to indicate a range of the corresponding availability and a range of the corresponding likelihood.

Example 3 includes the method of any of Examples 1-2, further comprising determining at least one of combined overall PAL impairment, static PAL impairment, and dynamic PAL impairment based upon at least one of the determined at least one spectrum availability and the determined likelihood of a radio being placed on a move list.

Example 4 includes the method of Example 3, wherein the at least one of combined overall PAL impairment, static PAL impairment, and dynamic PAL impairment are displayed as a map of a geographic region and using different indicia to indicate a range of the corresponding impairment.

Example 5 includes the method of any of Examples 1-4, wherein generating the at least one set of output data comprises generating output data that statistically characterizes parameters of the radio network as market penetration increases.

Example 6 includes the method of any of Examples 1-5, wherein the number of candidate geographic locations for a geographic region that is a smaller geographic region is determined by multiplying the number of radios per channel in the geographic region by a scaling factor.

Example 7 includes the method of Example 6, wherein the scaling factor is based upon a user defined minimum inter-radio distance.

Example 8 includes the method of any of Examples 6-7, wherein a product of the multiplication is either rounded up or a floor mathematical function is applied to the product.

Example 9 includes the method of any of Examples 1-8, wherein determining the static data set further comprises: determining if the transmit power level of any radio in the neighborhood and in the channel is below a threshold power level; and upon determining that the transmit power level of one or more radios in the neighborhood and in the channel are below the threshold, then determine a radio transmit power level, for a channel and for radios in the neighborhood determined to have a transmit power equal to or greater than the threshold power level, that distributes interference margin amongst the determined radios using the randomly selected values of the first set of radio parameters.

Example 10 includes the method of any of Examples 1-9, further comprising determining a maximum possible transmission power at each candidate radio location in the absence of interference from other radios; and displaying a map of a candidate radio locations in a geographic region using different indicia to indicate a range of the corresponding maximum possible transmission power at each candidate radio location.

Example 11 includes a system, comprising: processing circuitry configured to: obtain population data for the geographic region; determine a number of radios per channel in the geographic region, N'; determining candidate geographic location for radios in the geographic region; determining, for every channel in the shared spectra, at least one of a static dataset and a dynamic dataset; wherein the static dataset comprises a set of n*N'*R elements, where n is a number of data types, comprising at least one independent variable and at least one dependent variable, of the static dataset and R is a number of trials to determine the at least one dependent variable using random values of the at least one independent variable, where the data types comprise a first set of radio parameters whose values are randomly selected and a radio transmit power level for a channel, and where the radio transmit power level for the channel is determined so as to distribute interference margin amongst radios in a neighborhood of a protection point or an incumbent user using the randomly selected values of the first set of radio parameters; wherein the dynamic dataset comprises a set of l*N'*R elements, where l is a number of data types, comprising at least one independent variable and at least one dependent variable, of the dynamic data set, where the data types comprise a second set of radio parameters whose values are randomly selected and a move list of radios, operating in the channel, whose transmissions are terminated upon operation of an incumbent system using the channel, and where the move list is determined with the randomly selected values of the second set of radio parameters; and generate at least one set of output data that is a statistical characterization of the radio network, using at least one of the static dataset and the dynamic dataset, to determine at least one of spectrum availability over all geographic regions and likelihood of a radio being placed on a move list over all geographic regions.

Example 12 includes the system of Example 11, wherein the determined at least one of spectrum availability over all geographic regions and the determined likelihood of a radio being placed on a move list over all geographic regions are displayed as a map of geographic region and using different indicia to indicate a range of the corresponding availability and a range of the corresponding likelihood.

Example 13 includes the system of any of Examples 11-12, further comprising determine at least one of combined overall PAL impairment, static PAL impairment, and dynamic PAL impairment based upon at least one of the determined at least one spectrum availability and the determined likelihood of a radio being placed on a move list.

Example 14 includes the system of any of Examples 11-13, wherein the at least one of combined overall PAL impairment, static PAL impairment, and dynamic PAL impairment are displayed as a map of a geographic region and using different indicia to indicate a range of the corresponding impairment.

Example 15 includes the system of Examples 11-14, wherein generating the at least one set of output data comprises generating output data that statistically characterizes parameters of the radio network as market penetration increases.

Example 16 includes the system of any of Examples 11-15, wherein the number of candidate geographic locations for a geographic region that is a smaller geographic region is determined by multiplying the number of radios per channel in the geographic region by a scaling factor.

Example 17 includes the system of Example 16, wherein the scaling factor is based upon a user defined minimum inter-radio distance.

Example 18 includes the system of any of Examples 16-17, wherein a product of the multiplication is either rounded up or a floor mathematical function is applied to the product.

Example 19 includes the system of any of Examples 11-18, wherein determining the static data set further comprises: determining if the transmit power level of any radio in the neighborhood and in the channel is below a threshold power level; and upon determining that the transmit power level of one or more radios in the neighborhood and in the channel are below the threshold, then determine a radio transmit power level, for a channel and for radios in the neighborhood determined to have a transmit power equal to or greater than the threshold power level, that distributes interference margin amongst the determined radios using the randomly selected values of the first set of radio parameters.

Example 20 includes the method of any of Examples 11-19, wherein the processing circuitry is further configured to determine a maximum possible transmission power at each candidate radio location in the absence of interference from other radios; and display a map of a candidate radio locations in a geographic region using different indicia to indicate a range of the corresponding maximum possible transmission power at each candidate radio location.

Example 21 includes the system of any of Examples 11-20, wherein the processing circuitry is further configured to determine a correlation between at least one radio parameter and probability of being placed on a move list, where the at least one radio parameter comprises radio location.

Example 22 includes a program product comprising a non-transitory processor readable medium on which program instructions are embodied, wherein the program instructions are configured, when executed by at least one programmable processor, to cause the at least one programmable processor to: obtain population data for the geographic region; determine a number of radios per channel in the geographic region, N'; determining candidate geographic location for radios in the geographic region; determining, for every channel in the shared spectra, at least one of a static dataset and a dynamic dataset; wherein the static dataset comprises a set of n*N'*R elements, where n is a number of data types, comprising at least one independent variable and at least one dependent variable, of the static dataset and R is a number of trials to determine the at least one dependent variable using random values of the at least one independent variable, where the data types comprise a first set of radio parameters whose values are randomly selected and a radio transmit power level for a channel, and where the radio transmit power level for the channel is determined so as to distribute interference margin amongst radios in a neighborhood of a protection point or an incumbent user using the randomly selected values of the first set of radio parameters; wherein the dynamic dataset comprises a set of l*N'*R elements, where l is a number of data types, comprising at least one independent variable and at least one dependent variable, of the dynamic data set, where the data types comprise a second set of radio parameters whose values are randomly selected and a move list of radios, operating in the channel, whose transmissions are terminated upon operation of an incumbent system using the channel, and where the move list is determined with the randomly selected values of the second set of radio parameters; and generate at least one set of output data that is a statistical characterization of the radio network, using at least one of the static dataset and the dynamic dataset, to determine at least one of spectrum availability over all geographic regions and likelihood of a radio being placed on a move list over all geographic regions.

Example 23 includes the computer program product of Example 22, wherein the determined at least one of spectrum availability over all geographic regions and the determined likelihood of a radio being placed on a move list over all geographic regions are displayed as a map of geographic region and using different indicia to indicate a range of the corresponding availability and a range of the corresponding likelihood.

Example 24 includes the computer program product of any of Examples 22-23, wherein the program instructions are further configured, when executed by the at least one programmable processor, to cause the at least one programmable processor to determine at least one of combined overall PAL impairment, static PAL impairment, and dynamic PAL impairment based upon at least one of the determined at least one spectrum availability and the determined likelihood of a radio being placed on a move list.

Example 25 includes the computer program product of any of Examples 22-24, wherein the at least one of combined overall PAL impairment, static PAL impairment, and dynamic PAL impairment are displayed as a map of a geographic region and using different indicia to indicate a range of the corresponding impairment.

Example 26 includes the computer program product of any of Examples 22-25, wherein generating the at least one set of output data comprises generating output data that statistically characterizes parameters of the radio network as market penetration increases.

Example 27 includes the computer program product of any of Examples 22-26, wherein the number of candidate geographic locations for a geographic region that is a smaller geographic region is determined by multiplying the number of radios per channel in the geographic region by a scaling factor.

Example 28 includes the computer program product of Example 27, wherein the scaling factor is based upon a user defined minimum inter-radio distance.

Example 29 includes the computer program product of any of Examples 27-28, wherein a product of the multiplication is either rounded up or a floor mathematical function is applied to the product.

Example 30 includes the computer program product of any of Examples 22-29, wherein determining the static data set further comprises: determining if the transmit power level of any radio in the neighborhood and in the channel is below a threshold power level; and upon determining that the transmit power level of one or more radios in the neighborhood and in the channel are below the threshold, then determine a radio transmit power level, for a channel and for radios in the neighborhood determined to have a transmit power equal to or greater than the threshold power level, that distributes interference margin amongst the determined radios using the randomly selected values of the first set of radio parameters.

Example 31 includes the computer program product of any of Examples 22-30, wherein the program instructions are further configured, when executed by the at least one programmable processor, to cause the at least one programmable processor to determine a maximum possible transmission power at each candidate radio location in the absence of interference from other radios; and display a map of a candidate radio locations in a geographic region using different indicia to indicate a range of the corresponding maximum possible transmission power at each candidate radio location.

Example 32 includes the computer program product of any of Examples 22-31, wherein the program instructions are further configured, when executed by the at least one programmable processor, to cause the at least one programmable processor to determine a correlation between at least one radio parameter and probability of being placed on a move list, where the at least one radio parameter comprises radio location.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A method of modelling a radio network in a geographic region utilizing shared spectra, comprising:
obtaining population data for the geographic region;
determining a number of radios per channel in the geographic region, N';
determining candidate geographic location for radios in the geographic region; determining, for every channel in the shared spectra, at least one of a static dataset and a dynamic dataset;
  wherein the static dataset comprises a set of n*N'*R elements, where n is a number of data types, comprising at least one independent variable and at least one dependent variable, of the static dataset and R is a number of trials to determine the at least one dependent variable using random values of the at least one independent variable, where the data types comprise a first set of radio parameters whose values are randomly selected and a radio transmit power level for a channel, and where the radio transmit power level for the channel is determined so as to distribute interference margin amongst radios in a neighborhood of a protection point or an incumbent user using the randomly selected values of the first set of radio parameters;
  wherein the dynamic dataset comprises a set of l*N'*R elements, where l is a number of data types, comprising at least one independent variable and at least one dependent variable, of the dynamic data set, where the data types comprise a second set of radio parameters whose values are randomly selected and a move list of radios, operating in the channel, whose transmissions are terminated upon operation of an incumbent system using the channel, and where the move list is determined with the randomly selected values of the second set of radio parameters; and
generating at least one set of output data that is a statistical characterization of the radio network, using at least one of the static dataset and the dynamic dataset, to determine at least one of spectrum availability over all geographic regions and likelihood of a radio being placed on a move list over all geographic regions.

2. The method of claim 1, wherein the determined at least one of spectrum availability over all geographic regions and the determined likelihood of a radio being placed on a move list over all geographic regions are displayed as a map of geographic region and using different indicia to indicate a range of the corresponding availability and a range of the corresponding likelihood.

3. The method of claim 1, further comprising determining at least one of combined overall PAL impairment, static PAL impairment, and dynamic PAL impairment based upon at least one of the determined at least one spectrum availability and the determined likelihood of a radio being placed on a move list.

4. The method of claim 3, wherein the at least one of combined overall PAL impairment, static PAL impairment, and dynamic PAL impairment are displayed as a map of a geographic region and using different indicia to indicate a range of the corresponding impairment.

5. The method of claim 1, wherein generating the at least one set of output data comprises generating output data that statistically characterizes parameters of the radio network as market penetration increases.

6. The method of claim 1, wherein the number of candidate geographic locations for a geographic region that is a smaller geographic region is determined by multiplying the number of radios per channel in the geographic region by a scaling factor.

7. The method of claim 6, wherein the scaling factor is based upon a user defined minimum inter-radio distance.

8. The method of claim 6, wherein a product of the multiplication is either rounded up or a floor mathematical function is applied to the product.

9. The method of claim 1, wherein determining the static data set further comprises:
  determining if the transmit power level of any radio in the neighborhood and in the channel is below a threshold power level; and
  upon determining that the transmit power level of one or more radios in the neighborhood and in the channel are below the threshold, then determine a radio transmit power level, for a channel and for radios in the neighborhood determined to have a transmit power equal to or greater than the threshold power level, that distributes interference margin amongst the determined radios using the randomly selected values of the first set of radio parameters.

10. The method of claim 1, further comprising determining a maximum possible transmission power at each candidate radio location in the absence of interference from other radios; and
  displaying a map of a candidate radio locations in a geographic region using different indicia to indicate a range of the corresponding maximum possible transmission power at each candidate radio location.

11. A system, comprising:
processing circuitry configured to:
  obtain population data for the geographic region;

determine a number of radios per channel in the geographic region, N';

determining candidate geographic location for radios in the geographic region; determining, for every channel in the shared spectra, at least one of a static dataset and a dynamic dataset;

wherein the static dataset comprises a set of n*N'*R elements, where n is a number of data types, comprising at least one independent variable and at least one dependent variable, of the static dataset and R is a number of trials to determine the at least one dependent variable using random values of the at least one independent variable, where the data types comprise a first set of radio parameters whose values are randomly selected and a radio transmit power level for a channel, and where the radio transmit power level for the channel is determined so as to distribute interference margin amongst radios in a neighborhood of a protection point or an incumbent user using the randomly selected values of the first set of radio parameters;

wherein the dynamic dataset comprises a set of l*N'*R elements, where l is a number of data types, comprising at least one independent variable and at least one dependent variable, of the dynamic data set, where the data types comprise a second set of radio parameters whose values are randomly selected and a move list of radios, operating in the channel, whose transmissions are terminated upon operation of an incumbent system using the channel, and where the move list is determined with the randomly selected values of the second set of radio parameters; and generate at least one set of output data that is a statistical characterization of the radio network, using at least one of the static dataset and the dynamic dataset, to determine at least one of spectrum availability over all geographic regions and likelihood of a radio being placed on a move list over all geographic regions.

12. The system of claim 11, wherein the determined at least one of spectrum availability over all geographic regions and the determined likelihood of a radio being placed on a move list over all geographic regions are displayed as a map of geographic region and using different indicia to indicate a range of the corresponding availability and a range of the corresponding likelihood.

13. The system of claim 11, further comprising determine at least one of combined overall PAL impairment, static PAL impairment, and dynamic PAL impairment based upon at least one of the determined at least one spectrum availability and the determined likelihood of a radio being placed on a move list.

14. The system of claim 11, wherein the at least one of combined overall PAL impairment, static PAL impairment, and dynamic PAL impairment are displayed as a map of a geographic region and using different indicia to indicate a range of the corresponding impairment.

15. The system of claim 11, wherein generating the at least one set of output data comprises generating output data that statistically characterizes parameters of the radio network as market penetration increases.

16. The system of claim 11, wherein the number of candidate geographic locations for a geographic region that is a smaller geographic region is determined by multiplying the number of radios per channel in the geographic region by a scaling factor.

17. The system of claim 16, wherein the scaling factor is based upon a user defined minimum inter-radio distance.

18. The system of claim 16, wherein a product of the multiplication is either rounded up or a floor mathematical function is applied to the product.

19. The system of claim 11, wherein determining the static data set further comprises:

determining if the transmit power level of any radio in the neighborhood and in the channel is below a threshold power level; and upon determining that the transmit power level of one or more radios in the neighborhood and in the channel are below the threshold, then determine a radio transmit power level, for a channel and for radios in the neighborhood determined to have a transmit power equal to or greater than the threshold power level, that distributes interference margin amongst the determined radios using the randomly selected values of the first set of radio parameters.

20. The method of claim 11, wherein the processing circuitry is further configured to determine a maximum possible transmission power at each candidate radio location in the absence of interference from other radios; and display a map of a candidate radio locations in a geographic region using different indicia to indicate a range of the corresponding maximum possible transmission power at each candidate radio location.

21. The system of claim 11, wherein the processing circuitry is further configured to determine a correlation between at least one radio parameter and probability of being placed on a move list, where the at least one radio parameter comprises radio location.

22. A program product comprising a non-transitory processor readable medium on which program instructions are embodied, wherein the program instructions are configured, when executed by at least one programmable processor, to cause the at least one programmable processor to:

obtain population data for the geographic region;

determine a number of radios per channel in the geographic region, N';

determining candidate geographic location for radios in the geographic region; determining, for every channel in the shared spectra, at least one of a static dataset and a dynamic dataset;

wherein the static dataset comprises a set of n*N'*R elements, where n is a number of data types, comprising at least one independent variable and at least one dependent variable, of the static dataset and R is a number of trials to determine the at least one dependent variable using random values of the at least one independent variable, where the data types comprise a first set of radio parameters whose values are randomly selected and a radio transmit power level for a channel, and where the radio transmit power level for the channel is determined so as to distribute interference margin amongst radios in a neighborhood of a protection point or an incumbent user using the randomly selected values of the first set of radio parameters;

wherein the dynamic dataset comprises a set of l*N'*R elements, where l is a number of data types, comprising at least one independent variable and at least one dependent variable, of the dynamic data set, where the data types comprise a second set of radio parameters whose values are randomly selected and a move list of radios, operating in the channel, whose transmissions are terminated upon operation of an incumbent system using the channel, and where the move list is determined with the randomly selected values of the second set of radio parameters; and generate at least one set of output data that is a statistical characterization of the radio network, using at least one of the static dataset and the dynamic dataset, to determine at least one of spectrum availability over all geographic regions and likelihood of a radio being placed on a move list over all geographic regions.

23. The computer program product of claim 22, wherein the determined at least one of spectrum availability over all geographic regions and the determined likelihood of a radio being placed on a move list over all geographic regions are displayed as a map of geographic region and using different indicia to indicate a range of the corresponding availability and a range of the corresponding likelihood.

24. The computer program product of claim 22, wherein the program instructions are further configured, when executed by the at least one programmable processor, to cause the at least one programmable processor to determine at least one of combined overall PAL impairment, static PAL impairment, and dynamic PAL impairment based upon at least one of the determined at least one spectrum availability and the determined likelihood of a radio being placed on a move list.

25. The computer program product of claim 22, wherein the at least one of combined overall PAL impairment, static PAL impairment, and dynamic PAL impairment are displayed as a map of a geographic region and using different indicia to indicate a range of the corresponding impairment.

26. The computer program product of claim 22, wherein generating the at least one set of output data comprises generating output data that statistically characterizes parameters of the radio network as market penetration increases.

27. The computer program product of claim 22, wherein the number of candidate geographic locations for a geographic region that is a smaller geographic region is determined by multiplying the number of radios per channel in the geographic region by a scaling factor.

28. The computer program product of claim 27, wherein the scaling factor is based upon a user defined minimum inter-radio distance.

29. The computer program product of claim 27, wherein a product of the multiplication is either rounded up or a floor mathematical function is applied to the product.

30. The computer program product of claim 22, wherein determining the static data set further comprises:

determining if the transmit power level of any radio in the neighborhood and in the channel is below a threshold power level; and upon determining that the transmit power level of one or more radios in the neighborhood and in the channel are below the threshold, then determine a radio transmit power level, for a channel and for radios in the neighborhood determined to have a transmit power equal to or greater than the threshold power level, that distributes interference margin amongst the determined radios using the randomly selected values of the first set of radio parameters.

31. The computer program product of claim 22, wherein the program instructions are further configured, when executed by the at least one programmable processor, to cause the at least one programmable processor to determine a maximum possible transmission power at each candidate radio location in the absence of interference from other radios; and display a map of a candidate radio locations in a geographic region using different indicia to indicate a range of the corresponding maximum possible transmission power at each candidate radio location.

32. The computer program product of claim 22, wherein the program instructions are further configured, when executed by the at least one programmable processor, to cause the at least one programmable processor to determine a correlation between at least one radio parameter and probability of being placed on a move list, where the at least one radio parameter comprises radio location.

\* \* \* \* \*